United States Patent [19]

Tomizuka

[11] Patent Number: 5,661,522
[45] Date of Patent: Aug. 26, 1997

[54] TV CAMERA PROVIDED WITH SOLID IMAGE PICK-UP ELEMENT

[75] Inventor: Hideki Tomizuka, Kodaira, Japan

[73] Assignee: Hitachi Denshi Kabushiki Kaisha, Tokyo, Japan

[21] Appl. No.: 572,746

[22] Filed: Dec. 14, 1995

[30] Foreign Application Priority Data

Dec. 16, 1994 [JP] Japan .................................. 6-313480

[51] Int. Cl.⁶ .................................................. H04N 9/09
[52] U.S. Cl. ...................... 348/262; 348/234; 348/235; 348/264; 348/265
[58] Field of Search .................................. 348/222, 234, 348/235, 236, 237, 238, 262, 264, 265; 358/50; H04N 9/09

[56] References Cited

U.S. PATENT DOCUMENTS

| | | |
|---|---|---|
| 4,069,501 | 1/1978 | Yamanaka . |
| 4,725,881 | 2/1988 | Buchwald .................. 348/237 |
| 5,442,394 | 8/1995 | Lee .......................... 348/264 |

FOREIGN PATENT DOCUMENTS

| | | |
|---|---|---|
| 55-19553 | 5/1980 | Japan . |
| 61-7073 | 3/1986 | Japan . |

*Primary Examiner*—Sherrie Hsia
*Attorney, Agent, or Firm*—Antonelli, Terry, Stout & Kraus, LLP

[57] ABSTRACT

Each solid image pick-up element of G, R and B channels has a light-receiving portion composed of light-receiving pixels arranged two-dimensionally, that is, in the horizontal and the vertical scanning directions. The light-receiving pixels of the second and the third solid image pick-up elements are shifted to a horizontal direction by a half of a horizontal interval between the adjacent pixels with respect to the light-receiving pixels of the first solid image pick-up element in the horizontal scanning direction. The output of the first solid image pick-up element is sampled at every predetermined period so that the video signal of the G channel is obtained. The output of the second and the third solid image pick-up elements are sampled at every predetermined period to obtain the video signals of the R and the B channels so that the video signals are out of phase by 180 degrees with respect to the video signal of the G channel. The matrix operation is executed for the read video signals of the G, R and B channels to produce a first luminance signal. The video signals of the G and R channels are alternately switched with a period of half of that of the sampling frequency in a switching section. The output of the switching section is added to the first luminance signal to produce a second luminance signal. The resulting signal is output as the luminance signal of the TV camera.

11 Claims, 11 Drawing Sheets

TV CAMERA PROVIDED WITH SOLID IMAGE PICK-UP ELEMENT

BACKGROUND OF THE INVENTION

The present invention relates to a TV camera provided with a solid image pick-up element, and more particularly to such a TV camera that has an improved solution.

Figure 1:
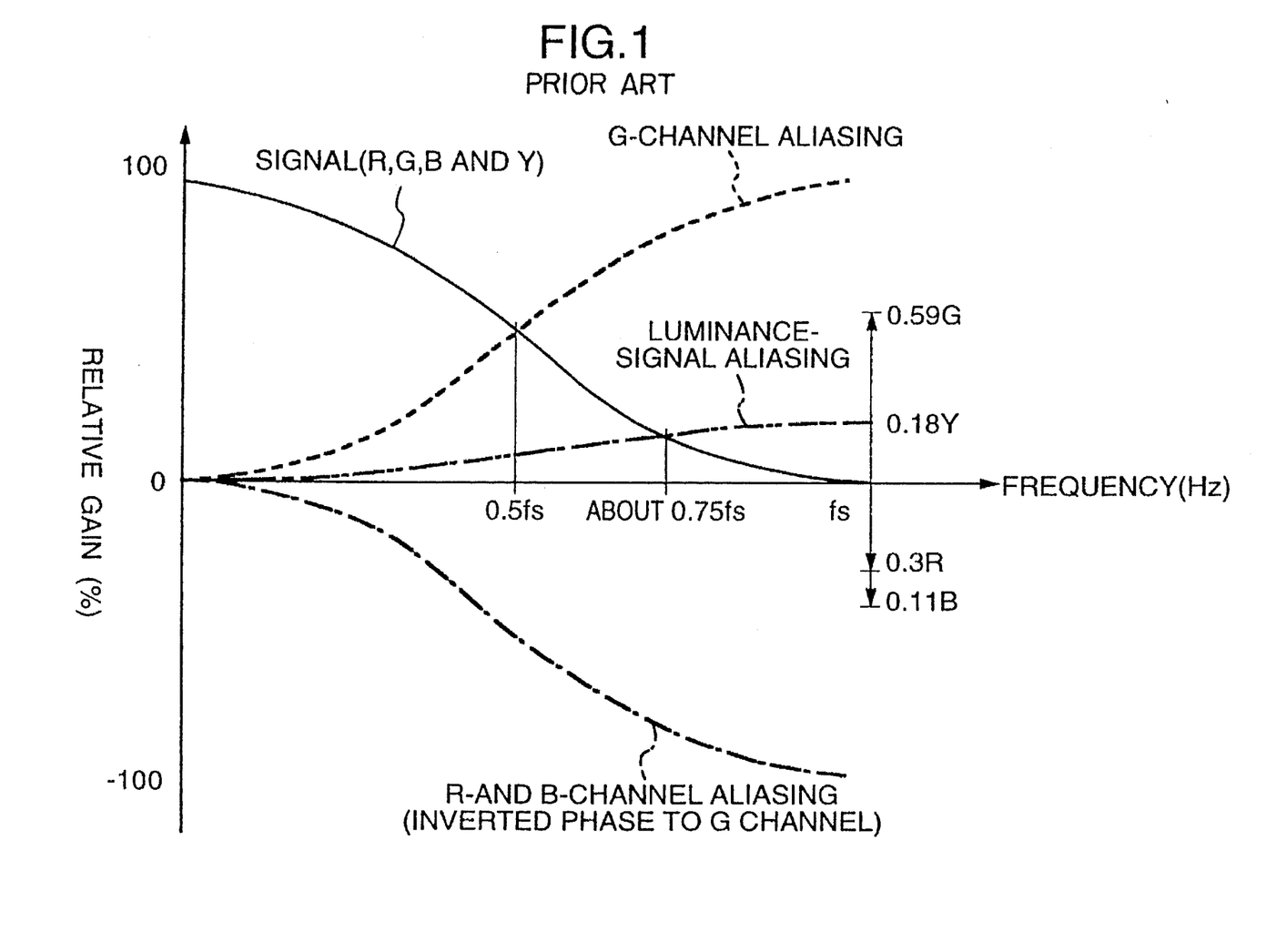
FIG. 1 is a graph showing a frequency characteristic of relative gains of a video signal and an aliasing.

As a routine result, when sampling a video signal sent from a solid image pick-up element, the TV camera provided with a solid camera element such as a CCD (Charge Coupled Device) brings about generation of an aliasing distortion (hereinafter simply referred to as "aliasing"). If the TV camera does not use so high a sampling frequency, the aliasing is intruded into a video band, so that a moire phenomenon (hereinafter simply referred to as "moire") may take place in the reproduced image. This results in degrading the image quality. FIG. 1 shows a frequency characteristic of relative gains of an aliasing and a video signal. In FIG. 1, fs denotes a sampling frequency.

Figure 2:
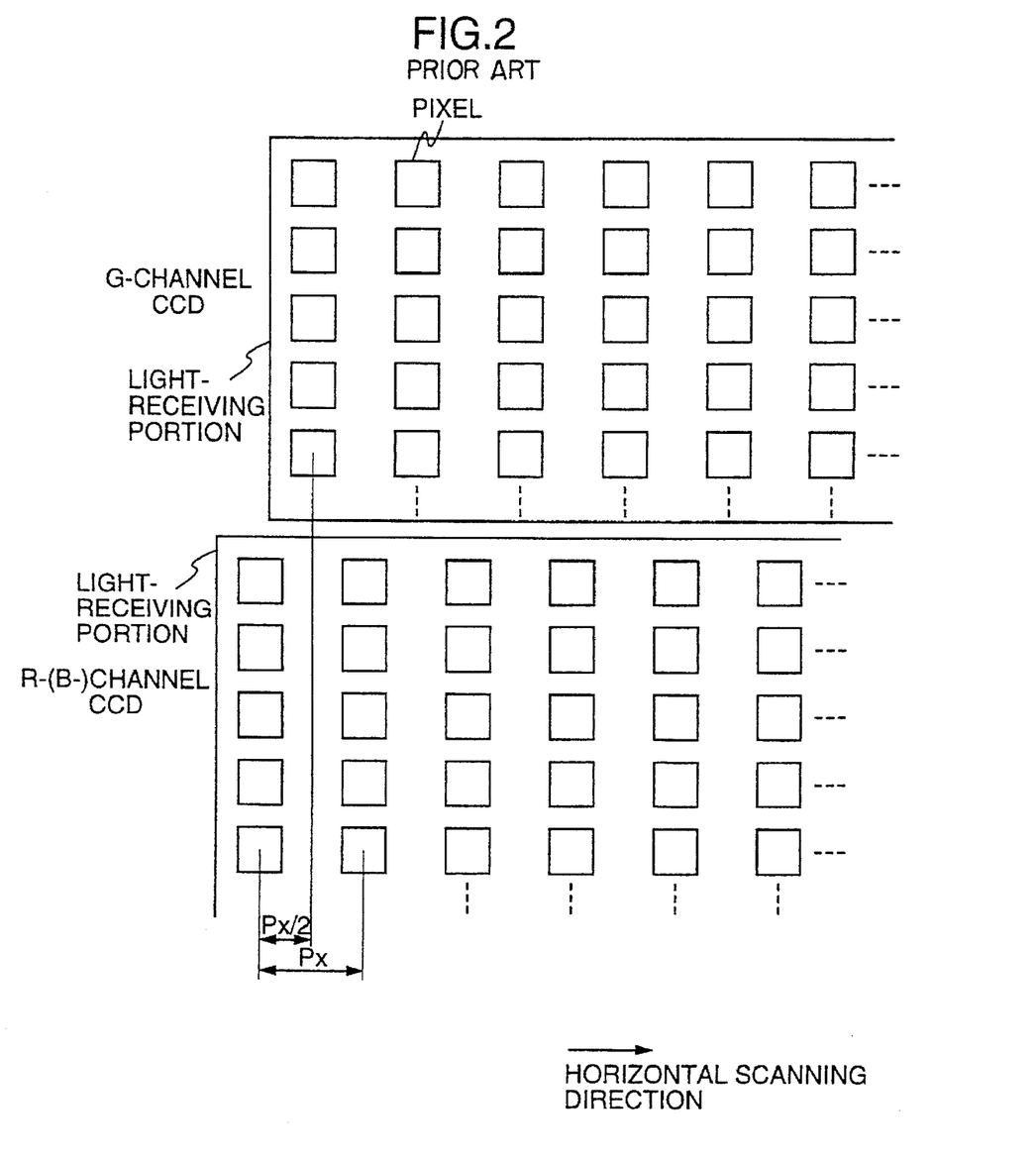
FIG. 2 is a view showing how pixels in solid image pick-up elements for R, G and B channels are spatially shifter.

As a method for reducing the aliasing indicated by a broken line and an alternate long and short dash line of FIG. 1, conventionally, the method called "Shifting of Space Pixel" has been known and published in U.S. Pat. No. 4,069,501 corresponding to JP-B-55-19553. This method uses a matrix operation function executed in the TV camera. As shown in FIG. 2, this method is arranged so that the pixels located on a light-receiving portion of a G (Green) channel CCD are shifted in the horizontal scan direction by a half of a horizontal pixel interval Px between the adjacent pixels with respect to the pixels located on the light-receiving portions of a R (Red) channel and a B (Blue) channel CCDs, respectively. This location of each CCD results in making the video signals of the R and B channels out of phase by 180 degrees with respect to the video signal of the G channel, thereby making the aliasings of those channels out of phase by 180 degrees as indicated by the dotted line and the alternate long and short dash line of FIG. 1. Herein, the resulting luminance signal Y, which is obtained by performing the matrix operation about the signals of the G, R and B channels, is represented by the following expression, for example:

$$Y=0.59G+0.30R+0.11B$$

wherein G, R and B denote the signal levels of the G, R and B channels, respectively. The white level ratio, that is, the ratio of white level (white reference voltage level) of the G, R, B channels in 1:1:1.

In this luminance signal Y, therefore, the aliasing component of the G channel (indicated by the dotted waveform of FIG. 1) is partially offset with the aliasing components of the R and B channels both in opposite phase to that of the G channel (indicated by the alternate long and short dash line of FIG. 1), which results in reducing the aliasing components. Actually, however, all of the aliasing components are not offset. About 18% of the aliasing (indicated by a two-dot chain line of FIG. 1), which is derived from the operation of 0.59−(0.30+0.11)=0.18, is left in the luminance signal (Y). In the frequency band around ¾ of the sampling frequency fs, that is, the frequency around 0.75 fs, hence, the substantially same aliasing components as the video signal components are left. In the higher frequency band than 0.75 fs, more aliasing components than the video signal components are able to be left. These aliasing components surpass the allowable level in light of the S/N ratio and thus are an obstacle to improving the resolution of the image.

Figure 3:
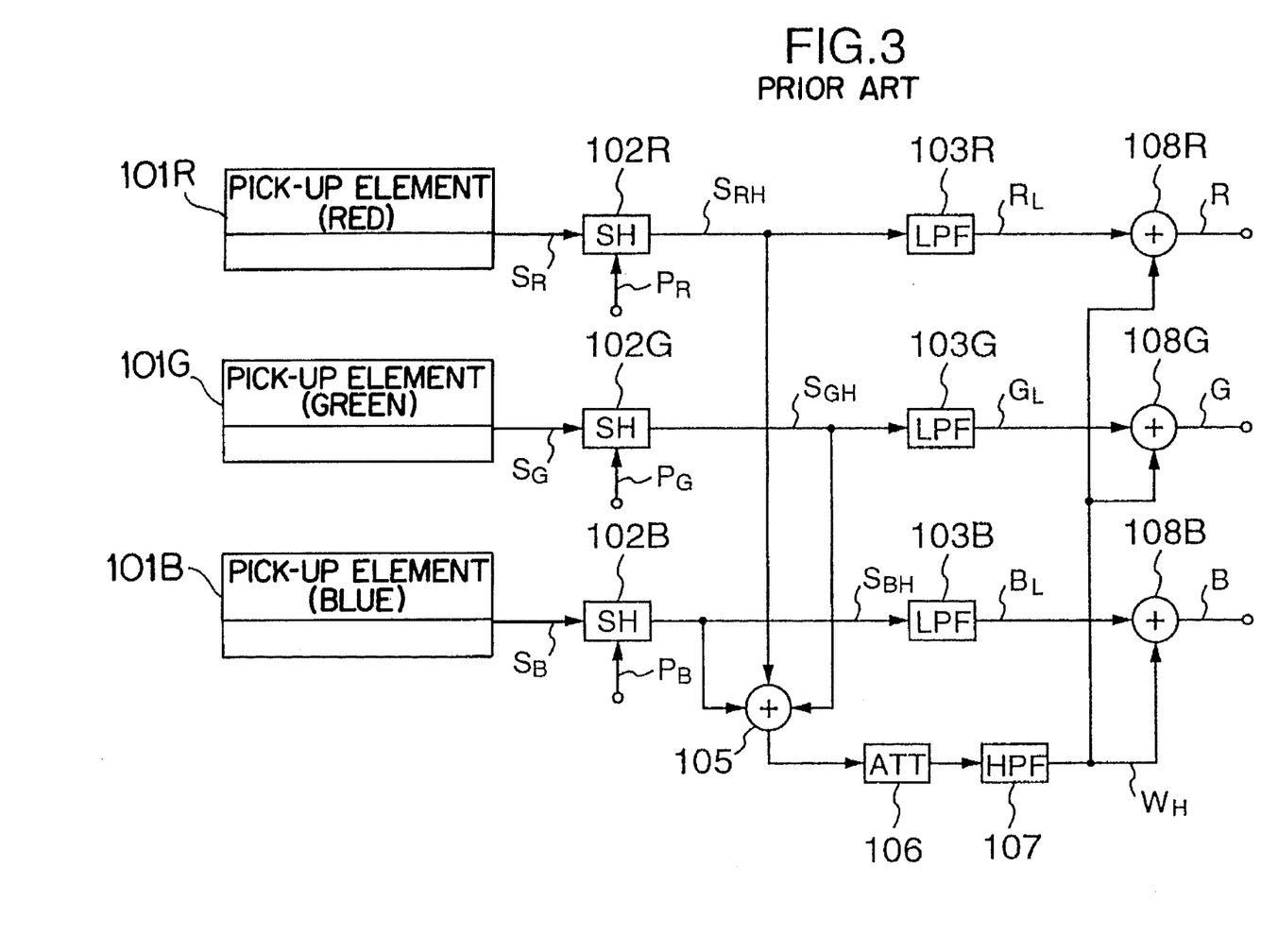
FIG. 3 is a block diagram showing an arrangement of a conventional solid image pick-up apparatus.
Figure 4:
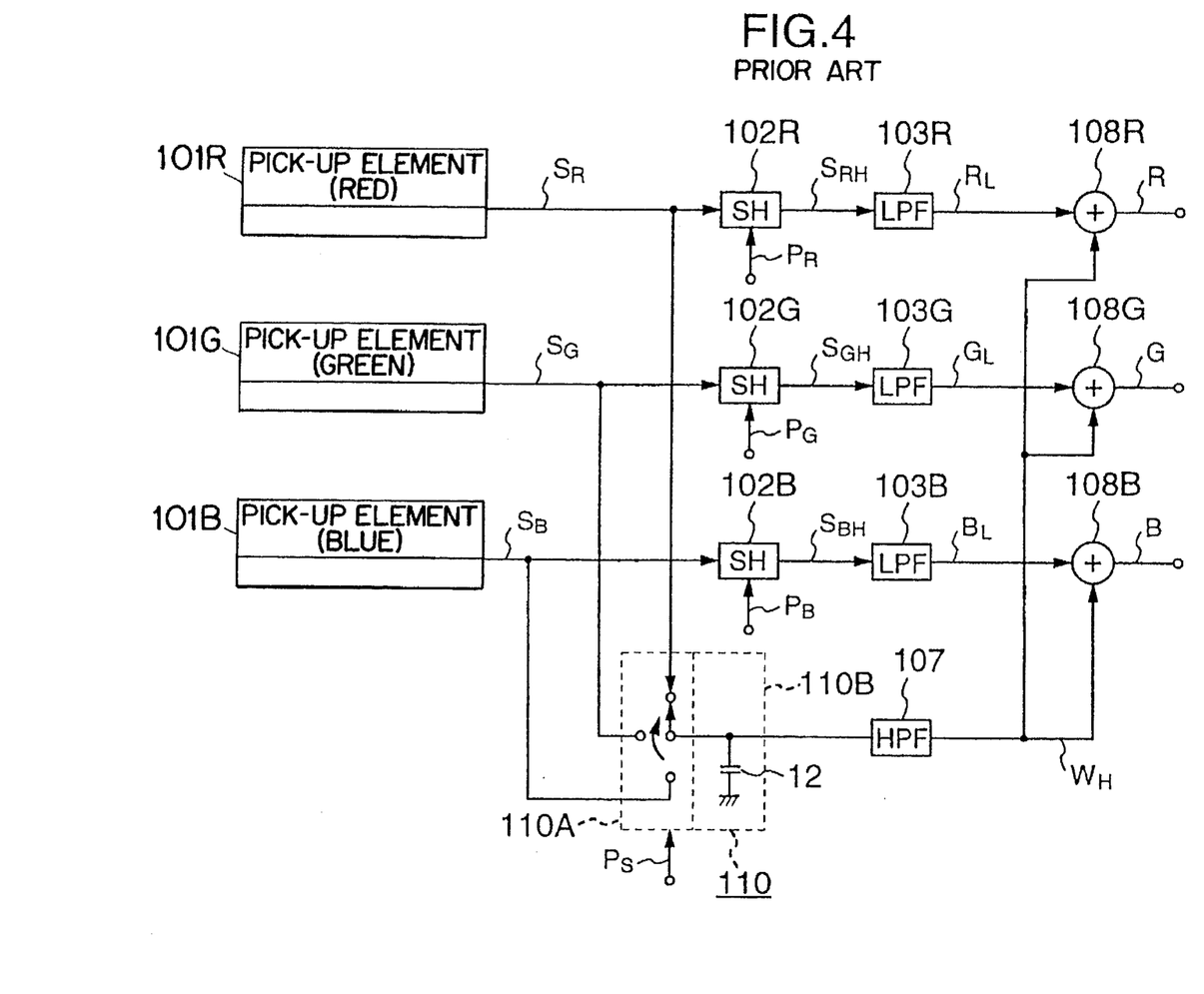
FIG. 4 is a block diagram showing an arrangement of another conventional solid image pick-up apparatus.
Figure 5:
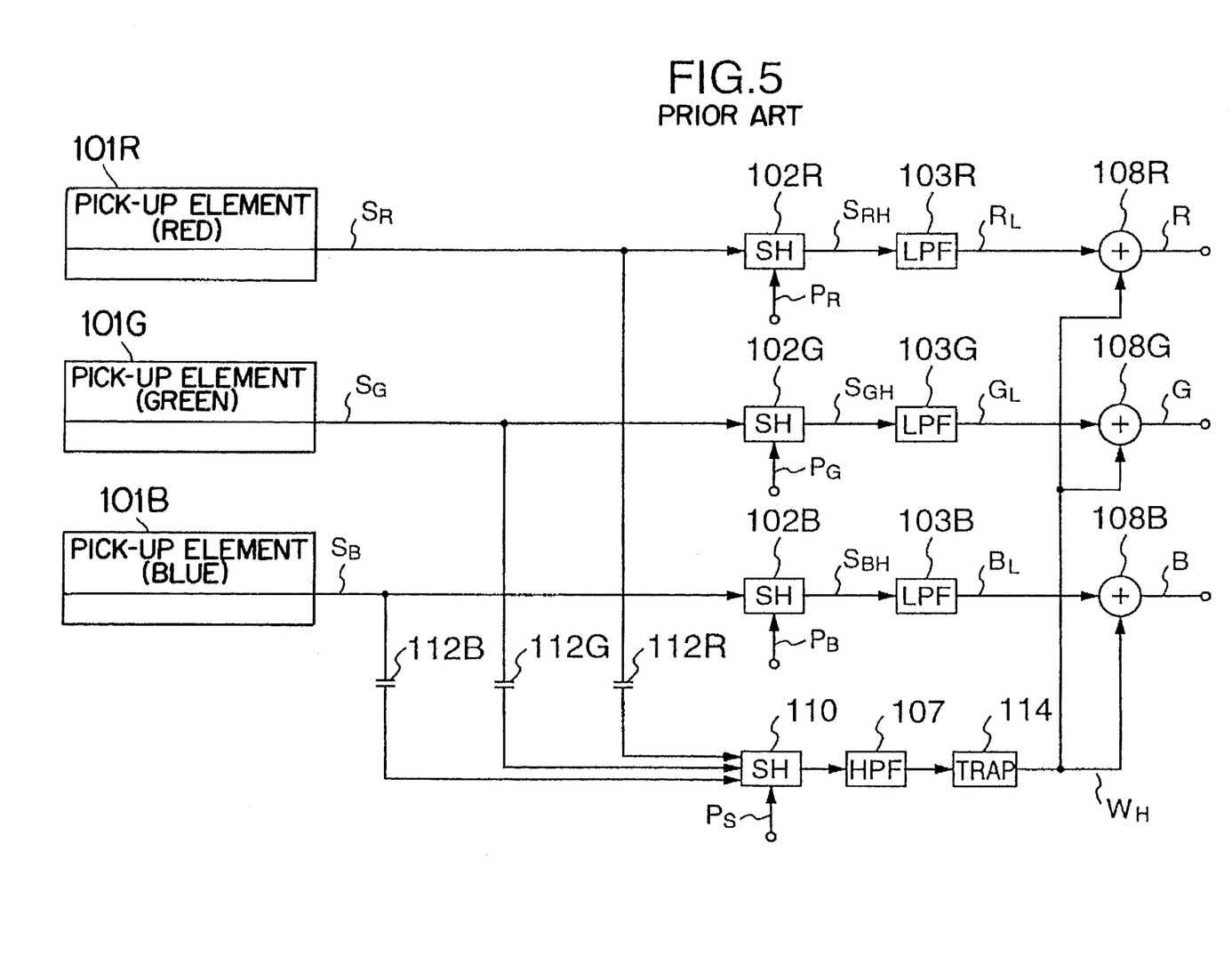
FIG. 5 is a block diagram showing an arrangement of a yet another conventional solid image pick-up apparatus.

Then, a further improved method was developed for improving a resolution of a multi-panel, for example, three-panel type CCD color TV camera with the "shifting of space pixels" method. This method is described in JP-B-61-7073 and shown in FIGS. 3 to 5 of the drawings appended to this specification. FIGS. 3 to 5 show the corresponding prior arts. The prior art shown in FIG. 3 (called the first prior art) is arranged to have three solid image pick-up elements 101R, 101G and 101B, three sample and hold circuits (SHs) 102R, 102G and 102B, three low-pass filters (LPFs) 103R, 103G and 103B, an adder 105, an attenuator (ATT) 106, a high-pass filter (HPF) 107, and three synthesizers 108R, 108G and 108B. In operation, the solid image pick-up elements 101R, 101G and 101B supplies the corresponding video signals. These video signals are sampled and held in the sample and hold circuits 102R, 102G and 102B, respectively. Then, these sampled and held signals $S_{RH}$, $S_{GH}$ and $S_{BH}$ pass through the low-pass filters 103R, 103G and 103B from which the low-pass components $R_L$, $G_L$ and $B_L$ of the primary color signals are derived. At once, these signals $S_{RH}$, $S_{GH}$ and $S_{BH}$ are added in the adder 105. The added output is sent to the attenuator 106 in which the signal level is reduced by a factor of 3. The level-reduced signal is sent to the high-pass filter 107 from which a high-pass component signal $W_H$ is derived. The high-pass signal $W_H$ is added to the low-pass components $R_L$, $G_L$ and $B_L$ through the effect of the corresponding synthesizers 108R, 108G and 108B. The resulting signals are made to be the high-resolution primary color signals R, G and B.

Next, the prior art shown in FIG. 4 (called the second prior art) will be described. The second prior art is arranged to have three solid image pick-up elements 101R, 101G and 101B, sample and hold circuits 102R, 102G and 102B, low-pass filters 103R, 103G and 103B, a sampling circuit 110A, a holding circuit 110B, a high-pass filter 107, and synthesizers 108R, 108G and 108B. In operation, the three solid image pick-up elements 101R, 101G and 101B supply the video output signals $S_R$, $S_G$ and $S_B$. These signals $S_R$, $S_G$ and $S_B$ are sampled and held in the corresponding sample and hold circuits 102R, 102G and 102B. The sampled and held signals are sent to the low-pass filters 103R, 103G and 103B through which the low-pass components $R_L$, $G_L$ and $B_L$ of the primary color signals are derived. At once, the video signals $S_R$, $S_G$ and $S_B$ are sent to the sampling circuit 110A in which the signals are changed in turn at a one-third period based on a sampling pulse Ps. The signals $S_R$, $S_G$ and $S_B$ are supplied to the holding circuit 110B by turns. The signal outputted from the circuit 110B is sent to the high-pass filter 107 through which derived is a high-pass component $W_H$ with an improved frequency characteristic. This high-pass component $W_H$ and the low-pass components $R_L$, $G_L$ and $B_L$ are added to each other at the corresponding synthesizers 108R, 108G and 108B respectively. The added signals are made to be the high-resolution primary color signals R, G and B.

Further, the prior art shown in FIG. 5 (called a third prior art) is arranged to have three solid image pick-up elements 101R, 101G and 101B, capacitors 112R, 112G and 112B, a sample and hold circuit (SH) 110, a high-pass filter 107, a trap circuit 114, sample and hold circuits 102R, 102G and 102B, low-pass filters 103R, 103G and 103B, and synthesizers 108R, 108G and 108B. In operation, the three solid image pick-up elements 101R, 101G and 101B supply the corresponding video signals to the corresponding capacitors 112R, 112G and 112B. These capacitors operate to cut dc components of these signals and send the dc-cut signals to the sample and hold circuit 110 in which the signals are changed by turns at a one-third period, based on the sampling pulse Ps. The sampled and held signal is sent to the high-pass filter 107 and then the trap circuit (TRAP) 114 for trapping a carrier frequency $F_C$, from which a high-pass signal $W_H$ is derived. The high-pass signal $W_H$ is synthesized with the low-pass signals $R_L$, $G_L$ and $B_L$ sent at the corresponding synthesizers 108R, 108G and 108B from the corresponding sample and hold circuits 102R, 102G and 102B. The synthesized signals are made to be the high-resolution primary color signals R, G and B.

The foregoing conventional solid image pick-up devices, that is, TV cameras, have the following shortcomings.

In the first prior art, though the three solid image pick-up elements are subject to the foregoing "shifting of spacial pixels", the high-pass component obtained by taking an adding means of the three video outputs through the adder 105 and the attenuator 106 contains the averaged video output, which has the reduced difference among the video signals by a one-third period. That is, the averaged video output lessens the effect of the "shifting of spacial pixels" and thus does not make so much contribution to enhancing the resolution. In other words, when the three video signals are simply added and averaged the sampling period becomes substantially longer, thereby suppressing the extension of the frequency band and lessening the effect of the "shifting of spacial pixels".

In the second and the third prior arts, as mentioned above, the output signals of the CCDs are sampled and held at a one-third period by the sample and hold circuit. The resulting high-pass component is synthesized with the low-pass component signals at a later stage of the sample and hold circuits 102R, 102G and 102B through the effect of the corresponding synthesizers 108R to 108B. This arrangement needs as many as three synthesizers. Further, if the signals with the high-pass component are digitized at a later stage of the synthesizers 108R to 108B, for example, re-sampled at the same frequency of the sampling frequency of the CCD, the sampling makes an aliasing of the high-pass component, which eliminates the effect of improving the resolution and produces more aliasing-based moires. Apparently, more moires make the quality of the video signal less. To eliminate the aliasing, for example, it is necessary to use three times as large a frequency as the sampling frequency of the CCD for digital processing the signals.

SUMMARY OF THE INVENTION

It is an object of the present invention to provide a TV camera that can overcome the foregoing shortcomings of the prior art.

It is another object of the present invention to provide a TV camera that can improve the degradation of the frequency characteristic of the luminance signal for suppressing an aliasing-based moire phenomenon appearing on the image, the degradation of the frequency characteristic being an important factor to the moire phenomenon.

In carrying out the aforementioned objects, according to an aspect of the invention, TV of the present invention camera includes first, second and third solid image pick-up elements for generating video signals of G (Green), R (Red) and B (Blue) channels, respectively, each of said solid image pick-up elements being composed of a plurality of light-receiving pixels arranged, in the horizontal and the vertical scanning directions, said light-receiving pixels of said second and third solid image pick-up elements being shifted to a horizontal scanning direction by a half of a horizontal interval between the adjacent pixels in the horizontal scanning direction with respect to the corresponding pixels of said first solid image pick-up element; a first sampling means coupled to said first solid image pick-up element for sampling the video signal of said G channel from said first solid image pick-up element at a predetermined period; a second sampling means coupled to said second and third solid image pickup elements for sampling the video signals of said R and B channels from said second and third solid image pick-up elements at said predetermined period, said first and second sampling means being so constructed that the output of said second sampling means is shifted by 180 degrees in phase with respect to that of said first sampling means; a matrix operating circuit for producing a first luminance signal from the video signals of said G, R and B channels; a switching means for alternately switching the video signals of said G and R channels with a period of half of the sampling period of said second sampling means; and an adding means for adding an output of said switching means to said first luminance signal sent from said matrix operating circuit to obtain a second luminance signal as a luminance signal of said TV camera.

According to an example of the invention, the band-pass filter provides a characteristic of cutting off the frequency substantially equal to or lower than the frequency of the first and the second sampling pulse signals.

According to another example of the invention, the band-pass filter provides a characteristic of cutting off the frequency substantially equal to or higher than a quarter of the frequency of the first and the second sampling pulse signals.

According to another example of the invention, the band-pass filter has a maximum gain band of the pass frequency band at substantially three quarters of the frequency of the first and the second sampling pulse signals.

In order to prevent occurrence of the moire phenomenon caused by the aliasing, it is considered that a high frequency band of the luminance signal is just intensified around the sampling frequency of the CCD. In this case, however, the aliasing component of the luminance signal is further intensified in the high frequency band.

To overcome this shortcoming, the TV camera according to the present invention is arranged to alternately switch the video signals of the R and the G channels with a period half of that of the sampling pulse signal for the solid image pick-up element and further switch the video signals of the R and the G channels at a white level ratio of one to one to thereby generate an auxiliary luminance signal. Hence, the thus-obtained auxiliary luminance signal is made to be a signal which is substantially the same as in frequency characteristic but slightly different in color balance characteristic from the luminance signal output from the matrix circuit which is generated based on the G, R, B channel signals when the solid image pick-up elements are sampled with frequency twice that of the sampling frequency. Further, the auxiliary luminance signal is a signal obtained by switching the video signals of the R and the G channels at a white level ratio of one to one, in which the video signals of the R and the G channels are out of phase by 180 degrees with each other, that is, are in opposite phase to each other. In the auxiliary luminance signal, hence, the aliasing component of the R-channel video signal is completely offset with the aliasing component of the G-channel video signal. It means that any wicked effect of aliasing component of the auxiliary luminance signal is not indicated in the image. In addition, this auxiliary luminance signal is band-limited by the band-pass filter. Then, the addition of the auxiliary luminance signal to the luminance signal obtained by performing a matrix operation about the video signals results in producing the final luminance signal. This final luminance signal has an improved S/N ratio up in the range of so high a frequency as the sampling one, which prevents occurrence of a moire phenomenon caused by the aliasing.

If the peak of the passage characteristic of the pass frequency band is set to about three quarters the sampling frequency in the band-pass filter, the resulting luminance signal may keep a luminance signal level higher than the aliasing level even around the three-quarters the sampling frequency. This makes it possible to suppress the degrade of the image quality of the video signal caused by the aliasing.

In the auxiliary luminance signal derived from the video signals of the R and the G channels, the effect on the resolution of the video signals is lessened in the higher frequency band than three-quarters the sampling frequency. Hence, as mentioned above, if the passage characteristic of the band-pass filter has a peak around a three-quarter of the sampling frequency, in such a frequency band, the resolution and the S/N ratio of the video signal within a desired frequency band are improved to the competent levels.

Moreover, the auxiliary luminance signal is composed of the video signals of the R and the G channels at a white level ratio of one-to-one. This ratio is close to the white level ratio (0.59:0.30:0.11) of the video signals of the R, the G and the B channels of the luminance signal which is composed by performing the matrix operation. This makes the effect on the color reproducibility of the video signal negligible. Further, the TV camera of this invention is arranged so that the video signals of the R and the G channels are alternately switched and sampled at a white level ratio of one to one for producing the auxiliary luminance signal. This circuit arrangement becomes quite simple as compared with the conventional ones.

Further, the luminance signal obtained by the matrix operation is added to the auxiliary luminance signal obtained from the video signals of the R and the G channels to thereby produce the final luminance signal. Hence, unlike the second and the third prior arts, the circuit arrangement of this invention does not need three synthesizers. This greatly contributes to achievement of the simple arrangement.

DESCRIPTION OF THE PREFERRED EMBODIMENTS

The TV camera according to an embodiment of the invention will be described with reference to the accompanying drawings.

Figure 6:
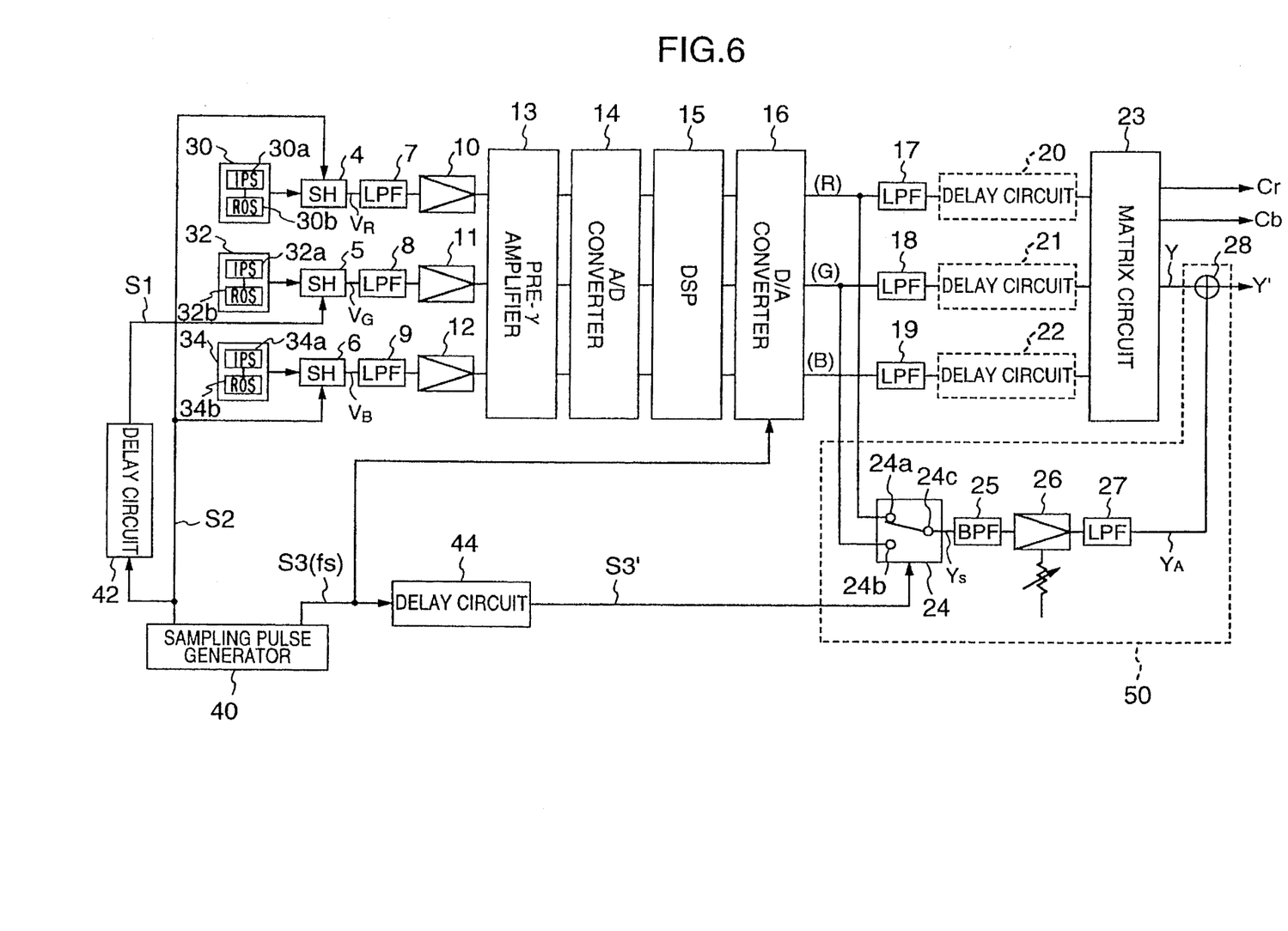
FIG. 6 is a block diagram showing an arrangement of a TV camera according to an embodiment of the present invention.
Figure 7:
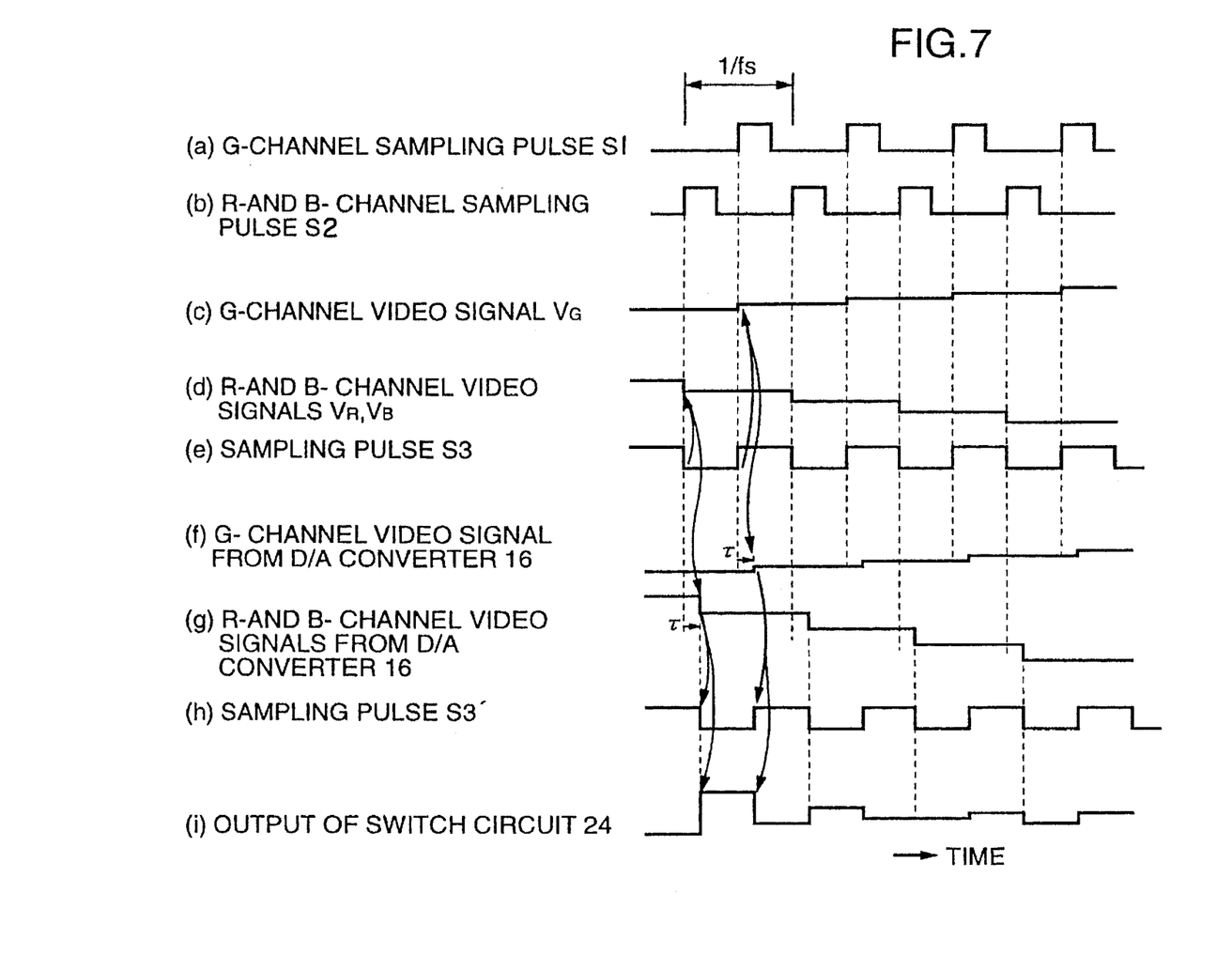
FIG. 7 is a timing chart showing a signal waveform of each portion for describing the operation of the TV camera shown in FIG. 6.

FIG. 6 is a block diagram showing an arrangement of the TV camera according to the embodiment of the invention. FIG. 7 is a timing chart showing a signal waveform appearing in each section of the TV camera for describing the operation thereof.

In FIG. 6, CCDs 30, 32 and 34 are IT (Interline Transfer) type ones intended for R, G and B channels, respectively. These CCDs 30, 32 and 34 include image pick-up section (IPS) (light-receiving sections) 30a, 32a and 34a and reading out sections (ROS) 30b, 32b and 34b, respectively. The CCD may be an FIT (Frame Interline Transfer) type. The charges generated by photoelectric conversion at the pixels of the image pick-up sections 30a, 32a and 34a are sequentially read out into reading out sections 30b, 32b and 34b, respectively. Like the arrangement shown in FIG. 2, the pixels composing the image pick-up section 32a of the G-channel CCD 32 are shifted by a half of a horizontal interval Px between the adjacent pixels with respect to the corresponding pixels composing the image pick-up sections 30a, 34a of the R-channel and the B-channel CCDs 30, 34, respectively.

A numeral 40 denotes a sampling pulse signal generator. The sampling pulse signal generator 40 operates to generate a sampling pulse signal S2 (see (b) of FIG. 7) of a predetermined period (according to frequency fs), and supply the signal S2 to the sampling circuits (SH) 4 and 6 for the R and the B channels, which operate to sample and hold the video signals outputted by the reading out section 30b of the R-channel CCD 30 and the reading out section 34b of the B-channel CCD 34, respectively. At once, the sampling pulse signal S2 is supplied to a delay circuit 42. The delay circuit 42 operates to delay the signal S2 by a half period of the predetermined period and output the delayed signal as a sampling pulse signal S1 (see (a) of FIG. 7) to the sampling circuits (SH) 5 for the G channel. In response to the signal S1, the sampling circuit 5 operates to sample and hold the video signal outputted by the reading out section 32b of the G-channel CCD32.

As mentioned above, the pixels composing the image pick-up section 32a of the G-channel CCD 32 are shifted by Px/2 (a half of the horizontal interval Px) with respect to the corresponding pixels composing the image pick-up sections 30a, 34a of the R-channel and the B-channel CCDs 30, 34 in the horizontal-scanning direction. In order to correspond to this location of the pixels, the sampling pulse signal S2 is phase-shifted, that is, delayed by a half period with respect to the sampling pulse signal S1. This makes the phase of sampling or switching period of the G-channel video signal $V_G$ (see (c) of FIG. 7) outputted from the sampling circuit 5 shift, that is, delay by a half period with respect to that of the R-channel and the B-channel video signals $V_R$ and $V_B$ (see (d) of FIG. 7) outputted from the sampling circuits 4 and 6, respectively.

Numerals 7, 8 and 9 denote low-pass filters (LPF), which operate to band-limit the outputted video signals $V_R$, $V_G$ and $V_B$ of the sampling circuits 4, 5, and 6 to the predetermined bands. Numerals 10, 11 and 12 denote video amplifiers for the R, the G and the B channels. A numeral 13 denotes a pre-γ amplifier for performing a pre-γ amplification about the output signals of the video amplifiers 10, 11 and 12 for each of the R, the G and the B channels. A numeral 14 denotes an analog-to-digital converter that performs an analog-to-digital conversion about the output signal of the pre-γ amplifier 13 in synchronism with the sampling frequency of the CCD for each of the R, the G and the B channels. A numeral 15 denotes a DSP (Digital Signal Processor) circuit for performing various kinds of treatments such as gamma correction or the like about a digital video signal and for performing digital signal processing of the video signals for each of the R, G, and B channels. A numeral 16 denotes a digital-to-analog converter that performs a digital-to-analog conversion about the output signal of the DSP circuit 15 for each of the R, the G and the B channels.

The TV camera further includes low-pass filter circuits (LPF) 17, 18 and 19 and a matrix circuit 23. The R-, the G- and the B-output signals are applied from the digital-to-analog converter 16 to the low-pass filter circuits 17, 18 and 19 for removing clock components appearing in the digital-to-analog conversion. The R-, the G- and the B-channel output signals are applied from the low-pass filter circuits 17, 18 and 19 to the matrix circuit 23 in which a luminance signal Y and color signals $C_r$ and $C_b$ are generated from the output signals.

The sampling pulse generator 40 operates to generate another sampling pulse signal S3 of a square wave (see (e) of FIG. 7). This pulse signal S3 is synchronism with the sampling pulse signal S2 and has a duty factor of 50%. The pulse signal S3 is applied to the digital-to-analog converter 16, which operates to perform digital-to-analog conversion about the R- and the B-channel video signals sent from the DSP 15 in synchronism with the falling edge of the pulse signal S3, for example. Hence, the digital-to-analog converter 16 operates to output the R- and the B-channel analog video signals which is delayed from the corresponding falling timing of the sampling pulse signal S3 by a time τ required for the digital-to-analog conversion in the converter 16 (see (g) of FIG. 7). Further, the digital-to-analog converter 16 operates to perform digital-to-analog conversion about the G-channel digital video signal sent from the DSP 15 to the analog signal in synchronism with the rising edge of the sampling pulse signal S3, for example. Hence, the digital-to-analog converter 16 operates to output the G-channel analog video signal which is delayed from the corresponding rising timing of the sampling pulse S3 by the time τ required for digital-to-analog conversion in the converter 16 (see (f) of FIG. 7). As such, the phase of the sampling or switching period of the G-channel video signal is delayed by a half period than that of the R- and the B-channel video signals.

The TV camera according to this embodiment further includes a circuit 50 for generating a luminance signal (an auxiliary luminance signal) $Y_A$ from the R- and the G-channel video signals from the digital-to-analog converter 16, for example, and adding the luminance signal $Y_A$ to the luminance signal Y sent from the matrix circuit 23 for producing a luminance signal Y'.

The circuit 50 includes an analog switch circuit 24 composed of two field effect transistors (FETs), for example.

The switch circuit 24 receives the R- and the G-channel video signals applied from the digital-to-analog converter 16 at the input terminals 24a and 24b. The output terminal 24c of the switch circuit 24 is connected to a band-pass filter (BPF) 25. The sampling pulse signal S3 sent from the sampling pulse generator 40 is delayed by a predetermined time by the delay circuit 44 and is applied as the sampling pulse signal S3' of a square wave with a duty factor 50% (see (h) of FIG. 7) to the switch circuit 24.

The delaying time of the delay circuit 44 is basically equivalent to the time τ required for performing the digital-to-analog conversion in the converter 16 and is set to the time required for synchronizing the sampling pulse signal S3' with the video signal from the digital-to-analog converter 16.

Hence, the switch circuit 24 operates to alternately switch the R- and the G-channel video signals from the digital-to-analog converter 16 respectively in synchronism with the high-level and low-level periods of the sampling pulse signal S3' with the duty factor of 50% and alternately feed the R- and the G-channel video signals to BPF 25. These video signals have the same width as the half period of the pulse signal S3' (see (i) of FIG. 7). That is, the switch circuit 24 operates to switch to the terminal 24a in synchronism with the fall of the sampling pulse signal S3', for example, and receive the R-channel video signal while the pulse signal S3' is at the low level. In synchronism with the rise of the pulse signal S3', the switch circuit 24 operates to switch to the terminal 24b and receive the G-channel video signal while the pulse signal S3' is at the high level.

Figure 8:
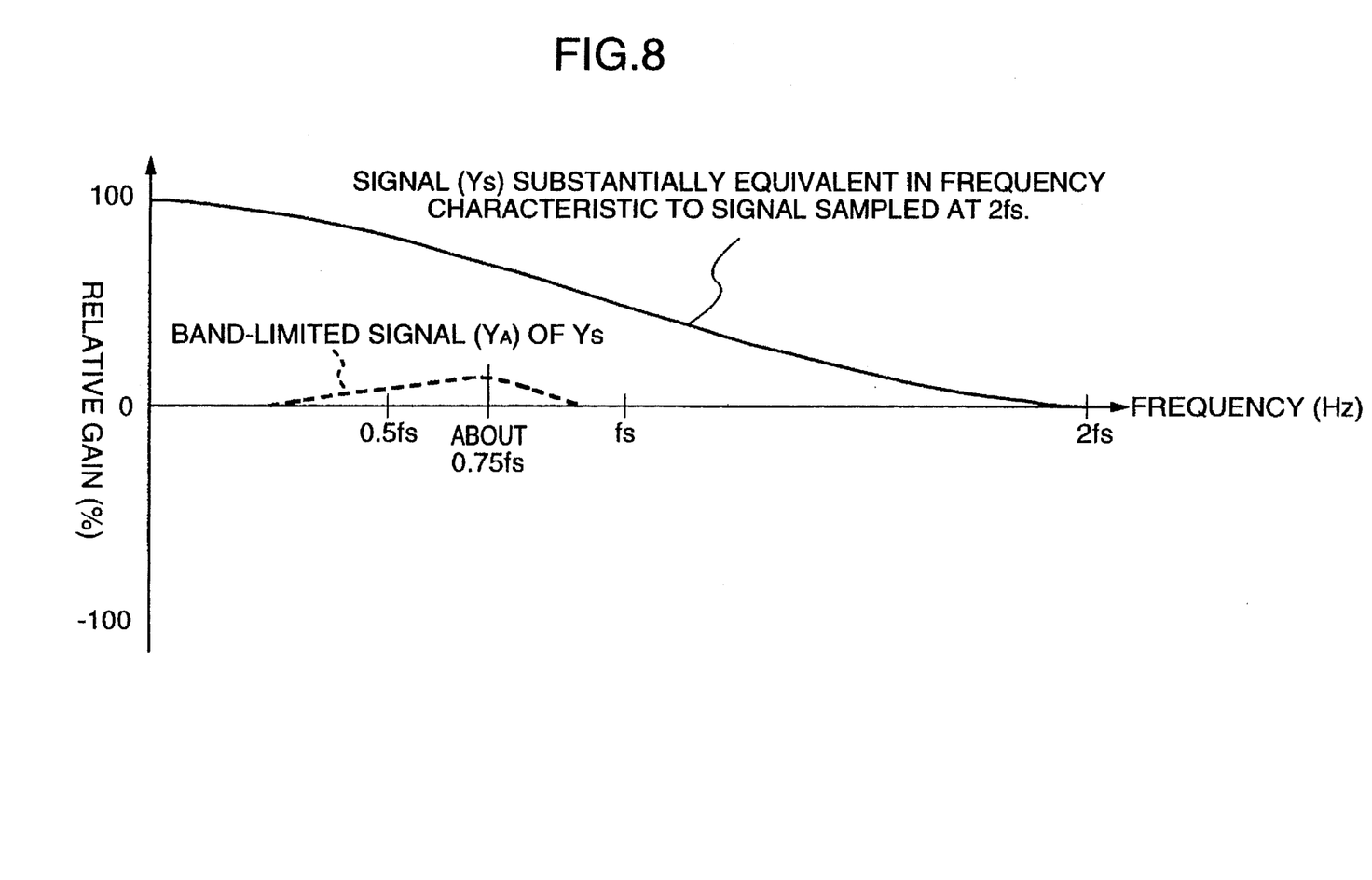
FIG. 8 is a chart showing a frequency characteristic of relative gains of the signals used in the embodiment of FIG. 6.

As noted above, the output timing of the R-channel signal from each horizontal pixel is shifted by a half of a horizontal distance between the adjacent pixels with respect to the output timing of the G-channel signal. Hence, the signal outputted from the switch circuit 24 is pseudoly made to be the signal whose switching period is equivalent to the luminance signal sampled by a double frequency (2 fs) of the output frequency fs from the CCD. The relative gain of this outputted signal from the switch circuit 24 is denoted by a steady line Ys of FIG. 8 which explains a frequency characteristic of the relative gain of the signal in the circuit 50. Further, this signal Ys is band-limited to a predetermined frequency band through the effect of the bandpass filter (BPF) 25. For example, this signal is band-limited in the range from about one-quarter the frequency fs of the output timing to less than the frequency fs (for example, 0.9 fs) so that the signal has a peak passage level around three-quarters the frequency fs of the sampling pulse signal S1.

The band-limited signal is amplified by the amplifier 26 and, if necessary, is further band-limited by the low-pass filter circuit 27. The resulting signal is made to be a luminance signal $Y_A$. The relative gain of the luminance signal $Y_A$ is shown by a broken line of FIG. 8. The luminance signal $Y_A$ is added to the output of the matrix circuit 23, that is, the luminance signal Y by the adder 28. The added signal is made to be a luminance signal Y', which has a luminance level magnified in the predetermined frequency band of the luminance signal Y. This luminance signal Y' is fed as the luminance signal of the TV camera.

Figure 9:
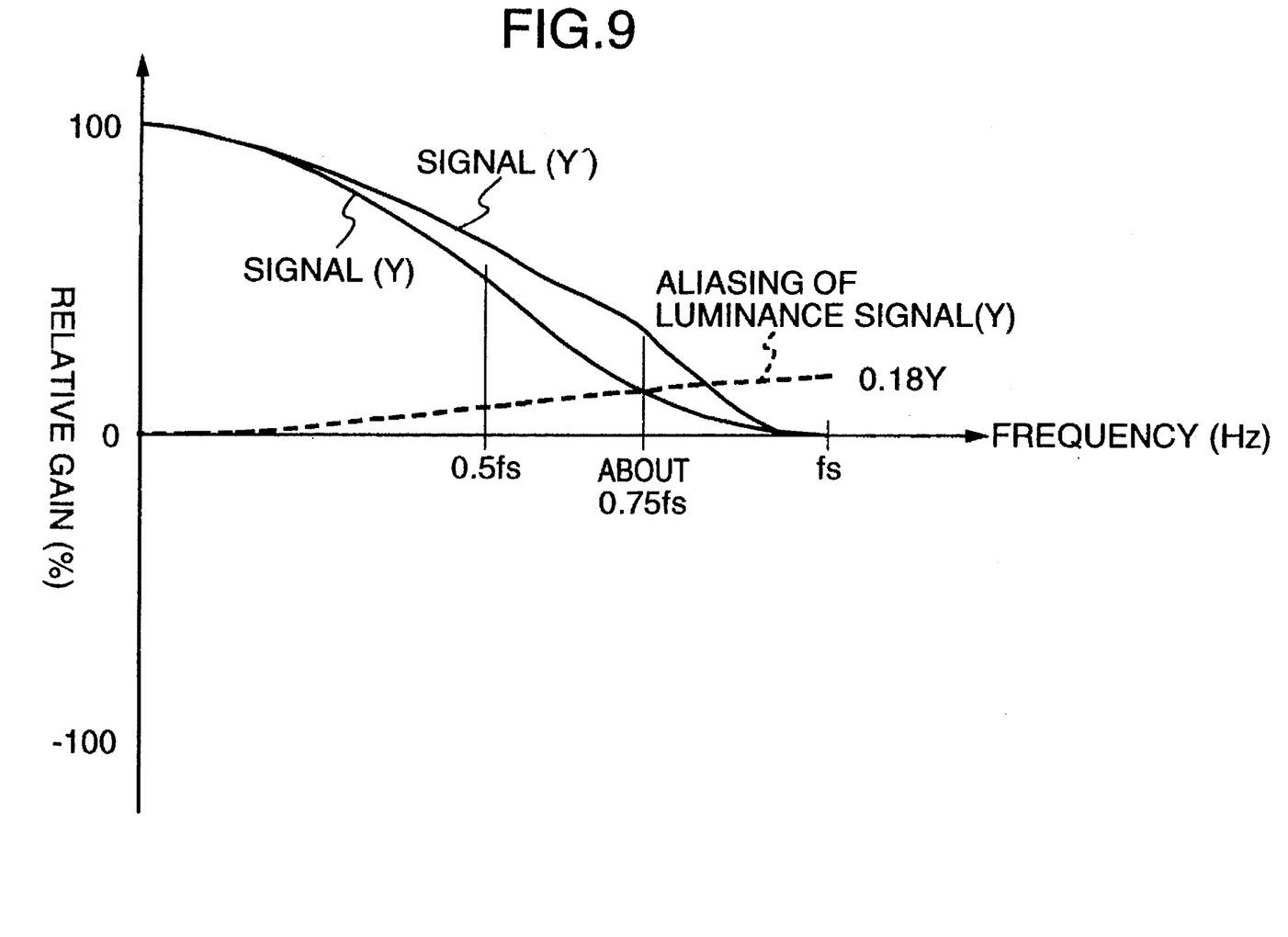
FIG. 9 is a chart showing a frequency characteristic of relative gains of a luminance signal or the like and the aliasing in the TV camera shown in FIG. 6.

The foregoing operation thus makes it possible to improve the frequency characteristic of the relative gain of the luminance signal Y' in comparison with the original luminance signal Y as shown in FIG. 9. The resulting video signal keeps an S/N ratio large up in the higher band. For example, the S/N ratio of the video signal is improved up in a higher band in a manner that the luminance signal Y' has about twice or more times as large a relative gain as the aliasing of the luminance signal Y at 0.75 fs.

If the phase relation of the luminance signal $Y_A$ is required to coincide with that of the luminance signal Y to be synthesized with the luminance signal $Y_A$ in the adder 28, for example, the delay circuits 20, 21 and 22 shown by a broken line of FIG. 6 may be inserted between the low-pass filters 17, 18 and 19 and the matrix circuit 23 for delaying the luminance signal Y by a predetermined time (mainly corresponding to the delaying time of the BPF 25).

As described above, the TV camera according to this embodiment is arranged to alternately sample the R- and the G-channel video signals from the digital-to-analog converter 16 with a double frequency of the sampling pulse signal S1 and to switch the R- and the G-channel video signals at a white level ratio of one-to-one to produce the luminance signal $Y_A$. Hence, the luminance signal $Y_A$ is made to be the signal which is substantially same in frequency characteristics as the luminance signal obtained by sampling the signal from the CCD with a double of the sampling frequency fs. The level of the luminance signal $Y_A$ is represented by the expression of $Y_A=0.5$ G+0.5 R in average. The R-channel video signal is out of phase by 180 degrees with respect to the G-channel video signal, that is, both of the video signals are in opposite phase to each other. In the luminance signal $Y_A$, therefore, the aliasing component of the R-channel video signal is completely offset with that of the G-channel video signal. It means that no aliasing component is contained in the luminance signal $Y_A$. This luminance signal $Y_A$ is adjusted to have a peak passage level around the frequency ¾ fs through the effect of the BPF 25. The luminance signal Y' thus obtained by adding such a luminance signal $Y_A$ to the luminance signal Y results in improving the S/N ratio of the resulting luminance signal Y', since the level of the luminance signal Y' is larger than the level of the aliasing component included in the luminance signals Y in a high-band frequency of the frequency fs or less. This prevents occurrence of a moire phenomenon caused by the aliasing.

In the frequency band surpassing the frequency ¾ fs, the effect of the luminance signal Y' on the resolution of the video signal is lessened. Hence, the luminance signal $Y_A$ adjusted to have a peak passage level around the frequency ¾ fs through the BPF 25 may competently improve the resolution and the S/N ratio of the video signal within the desired frequency band.

Further, this luminance signal $Y_A$ is composed of the R-channel and the G-channel video signals sampled at a white level ratio of one to one. Therefore, this ratio is close to the ratio (0.59:0.30:0.11) of the R-, the G- and the B-channel video signals from which the luminance signal is derived. It means that the luminance signal $Y_A$ applies a small effect on color reproducibility of the video signals. In addition, the TV camera is arranged so that the R- and the G-channel video signals are alternately switched at a one-to-one white level ratio to produce the luminance signal $Y_A$. Hence, the arrangement of the circuit 50 is simple.

Figure 10:
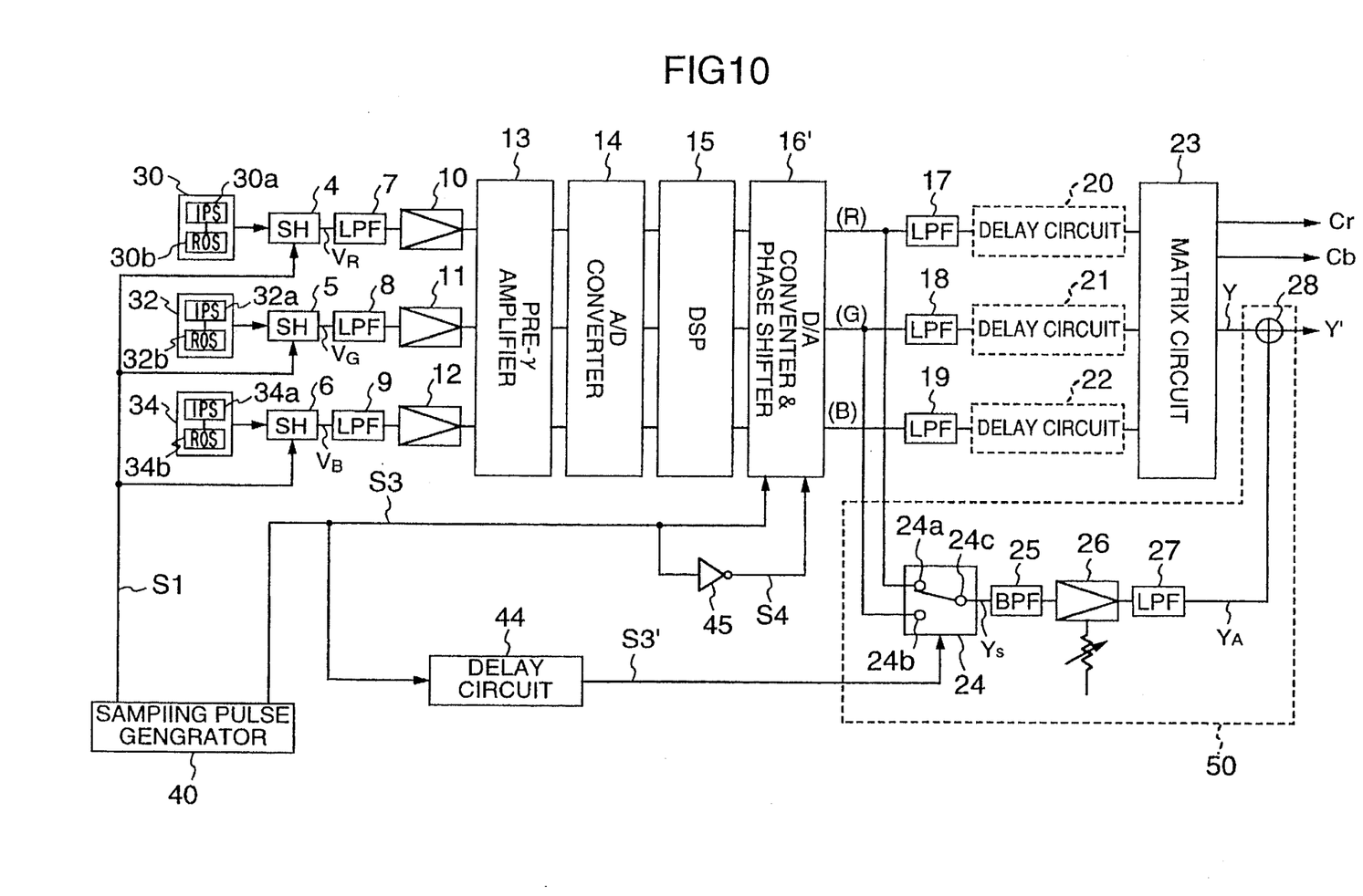
FIG. 10 is a block diagram showing an arrangement of a TV camera according to another embodiment of the invention.
Figure 11:
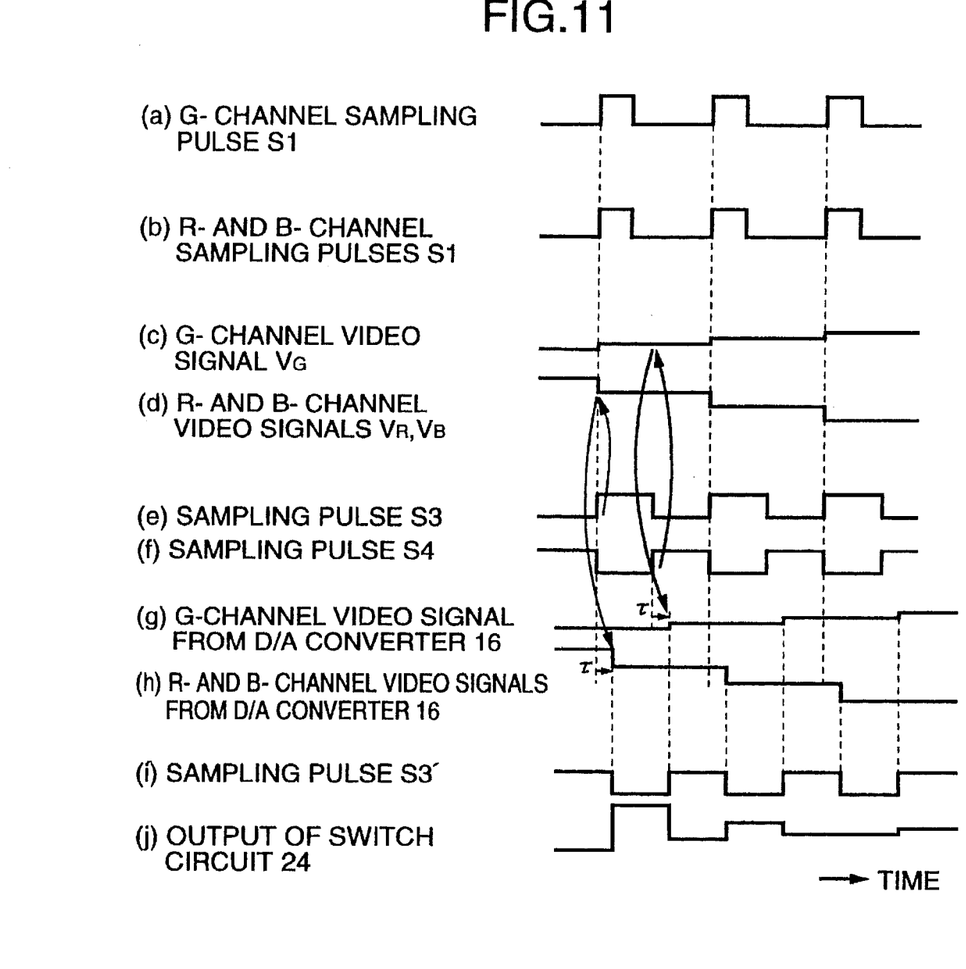
FIG. 11 is a timing chart showing a signal waveform of each portion for describing the operation of the TV camera shown in FIG. 10.

FIG. 10 is a block diagram showing an arrangement of a TV camera according to another embodiment of the present invention. FIG. 11 is a timing chart showing a .signal waveform appearing in each section for describing the operation of the embodiment shown in FIG. 10.

In FIG. 10, the sections and components have the same reference numbers as those of the embodiment shown in FIG. 6 if they have the same functions. Hence, the description about them is left out.

In this embodiment, the corresponding sampling circuits 4, 5 and 6 operate to sample and hold the signal on the timing of the common sampling pulse signal S1 (see (a) and (b) of FIG. 11). Hence, the video signals $V_R$, $V_G$ and $V_B$ sent from the sampling circuits 4, 5 and 6 have the same phases as shown in (c) and (d) of FIG. 11.

In the digital-to-analog converter and phase shifter 16' of this embodiment, the G-channel video signal is delayed by a half period of the sampling or switching period, that is, 180 degrees with respect to the R-channel and the B-channel video signals (see (g) and (h) of FIG. 11).

In this embodiment, as mentioned above, the converter and phase shifter 16' operate to delay the phase of the sampling or switching period of the G-channel video signal with respect to the phase of that of the R- and the B-channel video signals by a half period of that. For this operation, the converter and phase shifter 16' uses a sampling pulse signal S3 (See (e)) sent from a sampling pulse generator 40 and a sampling pulse signal S4 (See (f)) that is produced by inverting the phase of the signal S3 through an inverter 45. That is, the digital-to-analog converter and phase shifter 16' operates to convert the R-channel and the B-channel video signals sent from the DSP 15 into the analog signals in synchronism with the rise of the sampling pulse signal S3, for example. The converter and phase shifter 16', therefore, outputs the R- and the B-channel analog video signals at a time delayed by the time τ required for the digital-to-analog conversion (see (h) of FIG. 11). Further, the converter and phase shifter 16' operates to convert the G-channel digital video signal sent from the DSP 15 into an analog signal in synchronism with the rise of the signal S4, for example. Likewise, the converter and phase shifter 16' operates to output the G-channel analog video signal at a time delayed by a time τ required for the digital-to-analog conversion (see (g) of FIG. 7). This means that the G-channel video signal sent from the converter and phase shifter 16' is later than the R- and the B-channel video signals by a half period of the sampling a switching period. The sampling pulse S3' (See (i)) corresponds in an analogous context to that shown in FIGS. 6 and 7.

The switch circuit 24 operates in the same manner as that of the embodiment shown in FIG. 6.

As such, the switch circuit 24 produces the signal Ys like the embodiment shown in FIG. 6 (See (j)). Then, the adder 28 produces the same luminance signal Y' as that of the embodiment shown in FIG. 6.

FIGS. 7 and 11 exemplarily show that the G-channel video signal is monotonously increased in its level and the R- and the B-channel video signals are monotonously decreased in their levels.

In the embodiments shown in FIGS. 6 and 10, the luminance $Y_A$ is obtained by switching the R- and the G-channel video signals at a one-to-one white level ratio. In place, the white level ratio of the R- and the G-channel video signals may be closer to the white level ratio of the luminance signal Y. For example, the luminance signal $Y_A$ may be obtained by switching the R- and the G-channel video signals at a ratio of 0.6 to 0.4 so that the luminance signal $Y_A$ has closer color reproducibility to the luminance signal Y.

Alternatively, for producing the luminance signal $Y_A$, the R-, the G- and the B-channel video signals from the digital-to-analog converter 16 and the converter and phase shifter 16' may be switched at the same ratio as the ratio (0.59:0.30:0.11) of the R-, the G- and the B-channel video signals of the luminance signal Y. In this case, the frequency of the sampling pulse signal for operating the switch circuit 24 is set as the frequency 3 fs.

The G- and the B-channel video signals from the converter 16 and the converter and phase shifter 16' may be switched at a one-to-one white level ratio to produce the luminance signal $Y_A$. In this case, the luminance signal $Y_A$ provides lower color reproducibility that the luminance signal $Y_A$ produced by switching the R- and the G-channel video signals at a one-to-one white level ratio.

As described above, the TV camera according to the present invention is arranged to alternately switch and sample the G-channel video signal and the R-channel video signal at a half of a sampling period of the CCD for synthesizing both of the video signals, band-limit the synthesized signal, and add the band-limited signal to the matrix-operated luminance signal. The channels of the video signals are merely an example and may be replaced with the other ones. The resulting signal has an improved high-pass characteristic. That is, by expanding the band where the luminance component level of the video signal is larger than the aliasing level up to a high band, it is possible to suppress the degrade of the image quality caused by the aliasing. As a result, the TV camera according to the invention has a capability of imaging an object at higher resolution.

What is claimed is:

1. A TV camera comprising:

a first, a second and a third solid image pick-up elements for generating video signals of G (Green), R (Red) and B (Blue) channels, respectively, each of said solid image pick-up elements being composed of a plurality of light-receiving pixels arranged in horizontal and vertical scanning directions, said light-receiving pixels of said second and third solid image pick-up elements being shifted to the horizontal scanning direction by a half of a horizontal interval between the adjacent pixels in the horizontal scanning direction with respect to the corresponding pixels of said first solid image pick-up element;

a first sampling means coupled to said first solid image pick-up element for sampling the video signal of said G channel from said first solid image pick-up element at a predetermined period;

a second sampling means coupled to said second and third solid image pick-up elements for sampling the video signals of said R and B channels from said second and third solid image pick-up elements of said predetermined period, said first and second sampling means being so constructed that an output of said second sampling means is shifted by 180 degrees in phase with respect to an output of said first sampling means;

a matrix circuit responsive to the video signals of said G, R and B channels for producing a first luminance signal from the video signals of said G, R and B channels;

a switching means, responsive to at least the video signals of said G and R channels, for alternately switching the video signals of said G and R channels with a period of half of the sampling period of said second sampling means; and an adding means for adding an output of said switching means to said first luminance signal sent from said matrix circuit to obtain a second luminance signal as a luminance signal of said TV camera.

2. A TV camera as claimed in claim 1, further including a bandpass filter which is arranged between said switching means and said adding means.

3. A TV camera as claimed in claim 2, wherein said bandpass filter provides a characteristic of cutting off a frequency substantially equal to or lower than a sampling frequency of said second sampling means.

4. A TV camera as claimed in claim 2, wherein said bandpass filter provides a characteristic of cutting off a frequency substantially equal to or higher than a quarter of a sampling frequency of said second sampling means.

5. A TV camera as claimed in claim 2, wherein said bandpass filter provides a characteristic that a maximum gain band of its pass band is placed around substantially three-quarters of a sampling frequency of said second sampling means.

6. A TV camera as claimed in claim 1, further including a digital signal processing means responsive to said first, second and third image pick-up elements for performing a digital signal processing of the video signals of said G, R and B channels respectively, the output of said digital signal processing means being supplied to said matrix circuit and said switching means.

7. A TV camera comprising:

a first, a second and a third solid image pick-up elements for generating video signals of G (Green), R (Red) and B (Blue) channels, respectively, each of said solid image pick-up elements being composed of a plurality of light-receiving pixels arranged in horizontal and vertical scanning directions, said light-receiving pixels of said second and third solid image pick-up elements being shifted to the horizontal scanning direction by a half of a horizontal interval between the adjacent pixels in the horizontal scanning direction with respect to the corresponding pixels of said first solid image pick-up element;

a first and a second sampling means coupled to said image pick-up elements, respectively, for sampling the video signals of said G, R and B channels from said first, second and third solid image pick-up elements at a predetermined period;

phase shifting means coupled to said first and second sampling means for shifting a phase of the video signals of said R and B channels outputted from said second sampling means out of the phase of the video signal of said G channel outputted from said first sampling means by 180 degrees;

a matrix circuit, responsive to the video signals of said G, R and B channels, for producing a first luminance signal from the video signals of said G, R and B channels;

a switching means, responsive to at least the video signals of said G and R channels, for alternately switching the video signals of said G and R channels with a period of half of the sampling period of said second sampling means; and an adding means for adding an output of said switching means to said first luminance signal sent from said matrix circuit to obtain a second luminance signal as a luminance signal of said TV camera.

8. A TV camera as claimed in claim 1, further including a bandpass filter which is arranged between said switching means and said adding means.

9. A TV camera as claimed in claim 8, wherein said bandpass filter provides a characteristic of cutting off a frequency substantially equal to or lower than a sampling frequency of said first sampling means.

10. A TV camera as claimed in claim 8, wherein said bandpass filter provides a characteristic of cutting off a frequency substantially equal to or higher than a quarter of a sampling frequency of said first sampling means.

11. A TV camera as claimed in claim 8, wherein said bandpass filter provides a characteristic that a maximum pass band of its pass band is placed around substantially three-quarters of a sampling frequency of said first sampling means.

* * * * *